United States Patent
Ng

(10) Patent No.: US 12,439,168 B2
(45) Date of Patent: Oct. 7, 2025

(54) SYSTEMS, DEVICES, AND METHODS FOR MANAGING IMAGE CAPTURING ILLUMINATION FOR A MOBILE DEVICE

(71) Applicant: Casetagram Limited, Hong Kong (HK)

(72) Inventor: Pui Sun Wesley Ng, Hong Kong (HK)

(73) Assignee: Casetagram Limited, Hong Kong (HK)

( * ) Notice: Subject to any disclaimer, the term of this patent is extended or adjusted under 35 U.S.C. 154(b) by 0 days.

(21) Appl. No.: 18/673,334

(22) Filed: May 24, 2024

(65) Prior Publication Data

US 2024/0314449 A1   Sep. 19, 2024

Related U.S. Application Data

(62) Division of application No. 17/538,590, filed on Nov. 30, 2021, now Pat. No. 11,997,395.

(51) Int. Cl.

| | |
|---|---|
| *H04N 23/74* | (2023.01) |
| *H04N 23/51* | (2023.01) |
| *H04N 23/56* | (2023.01) |
| *H04N 23/57* | (2023.01) |
| *H04N 23/71* | (2023.01) |
| *H04W 4/80* | (2018.01) |

(52) U.S. Cl.
CPC ............. *H04N 23/74* (2023.01); *H04N 23/51* (2023.01); *H04N 23/56* (2023.01); *H04N 23/57* (2023.01); *H04N 23/71* (2023.01); *H04W 4/80* (2018.02)

(58) Field of Classification Search
CPC ........ H04N 23/74; H04N 23/51; H04N 23/56; H04N 23/57; H04N 23/71; H04N 23/90; H04W 4/80; H04M 1/0264; H04M 1/21; H04M 2250/52; H04M 1/22

See application file for complete search history.

(56) References Cited

U.S. PATENT DOCUMENTS

| | | | |
|---|---|---|---|
| 9,521,321 B1 * | 12/2016 | Kozko | H04N 23/698 |
| 11,003,048 B1 * | 5/2021 | Rawlani | A61B 5/0077 |

* cited by examiner

*Primary Examiner* — Yogesh K Aggarwal

(57) ABSTRACT

Embodiments relate to systems, devices, and methods for managing image capturing illumination. The system includes a main housing assembly and illumination assembly securable to the main housing assembly. The illumination assembly includes an illumination securing assembly. The illumination securing assembly is configured to secure the illumination assembly to the main housing assembly. The illumination securing assembly is configured to enable the illumination assembly to move relative to the main housing assembly. The illumination assembly includes front and rear side illumination sources. The illumination assembly includes an illumination controller. The illumination controller is configured to control the rear and/or front side illumination sources to provide image capturing illumination and not provide image capturing illumination.

22 Claims, 8 Drawing Sheets

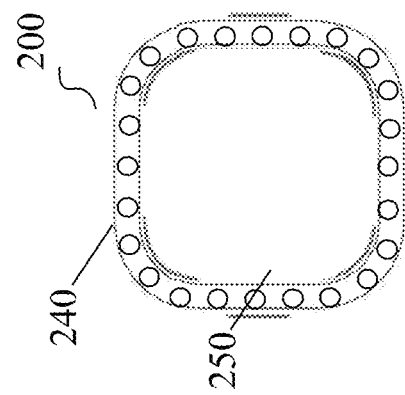
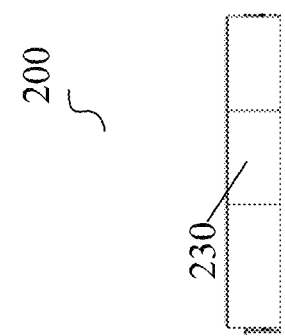
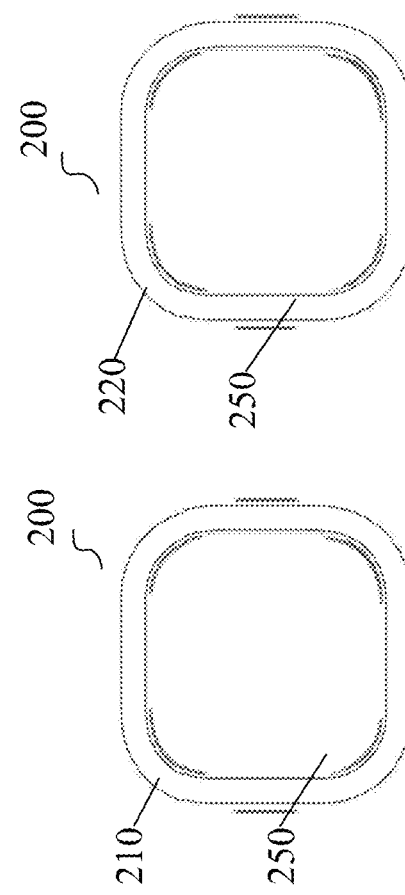
FIGURE 3D   FIGURE 3C   FIGURE 3B   FIGURE 3A

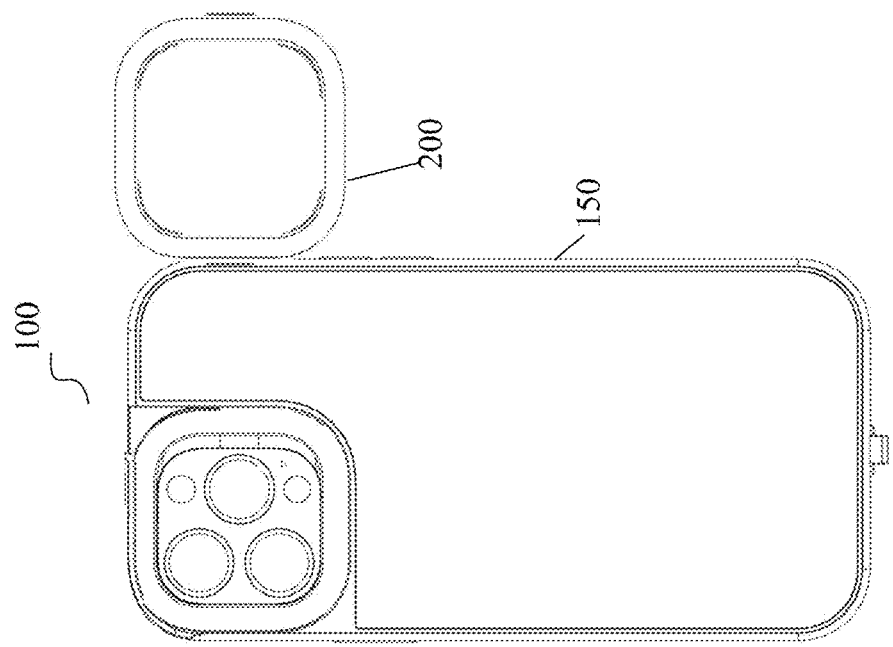
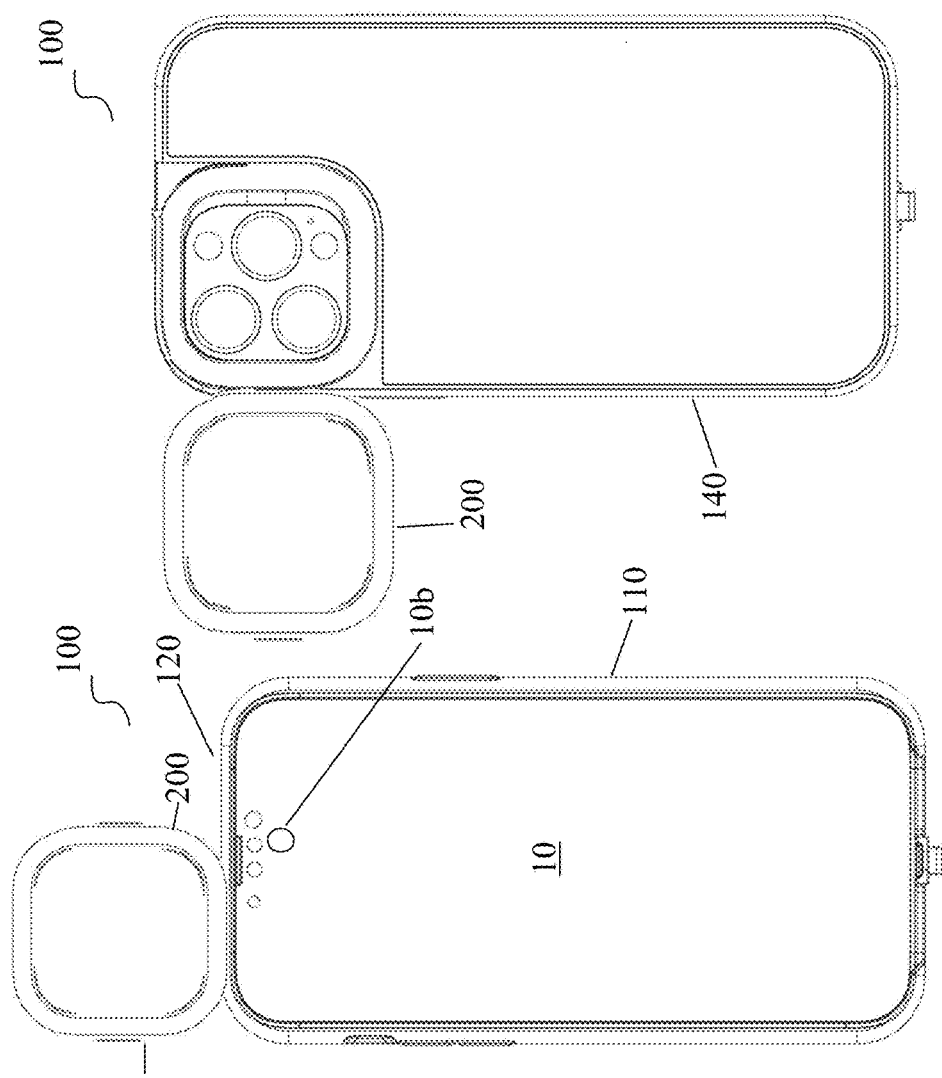

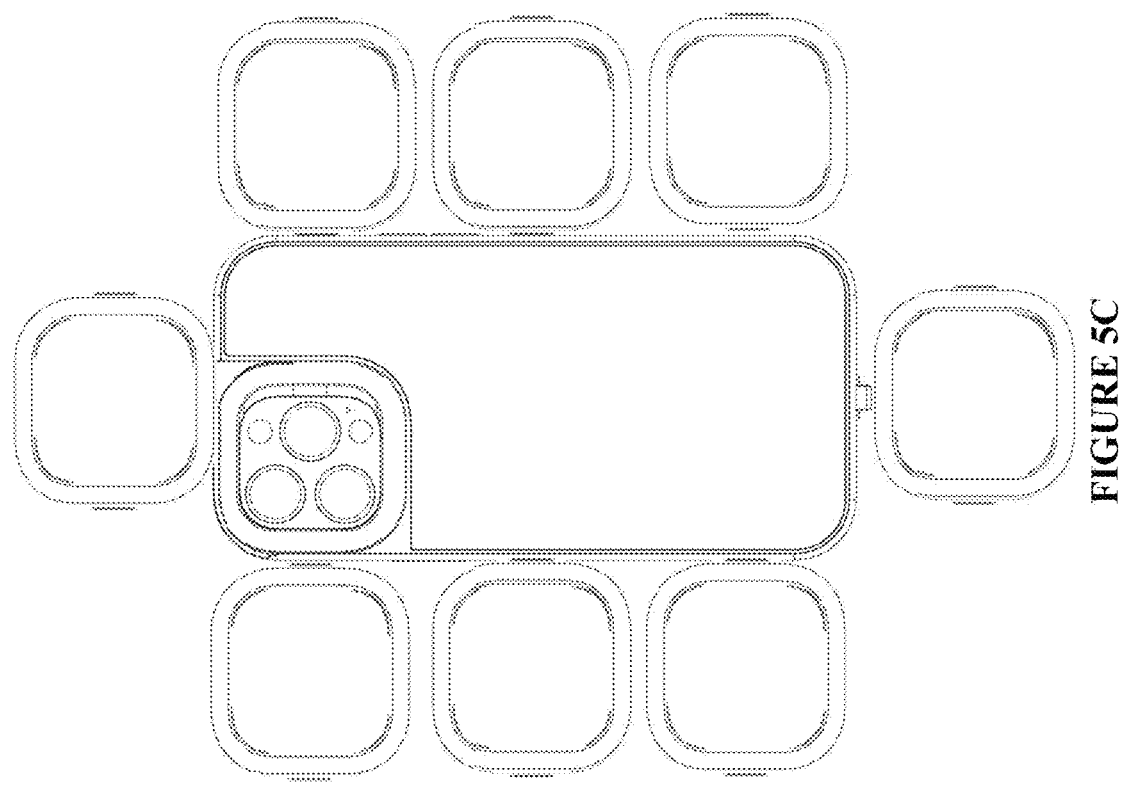

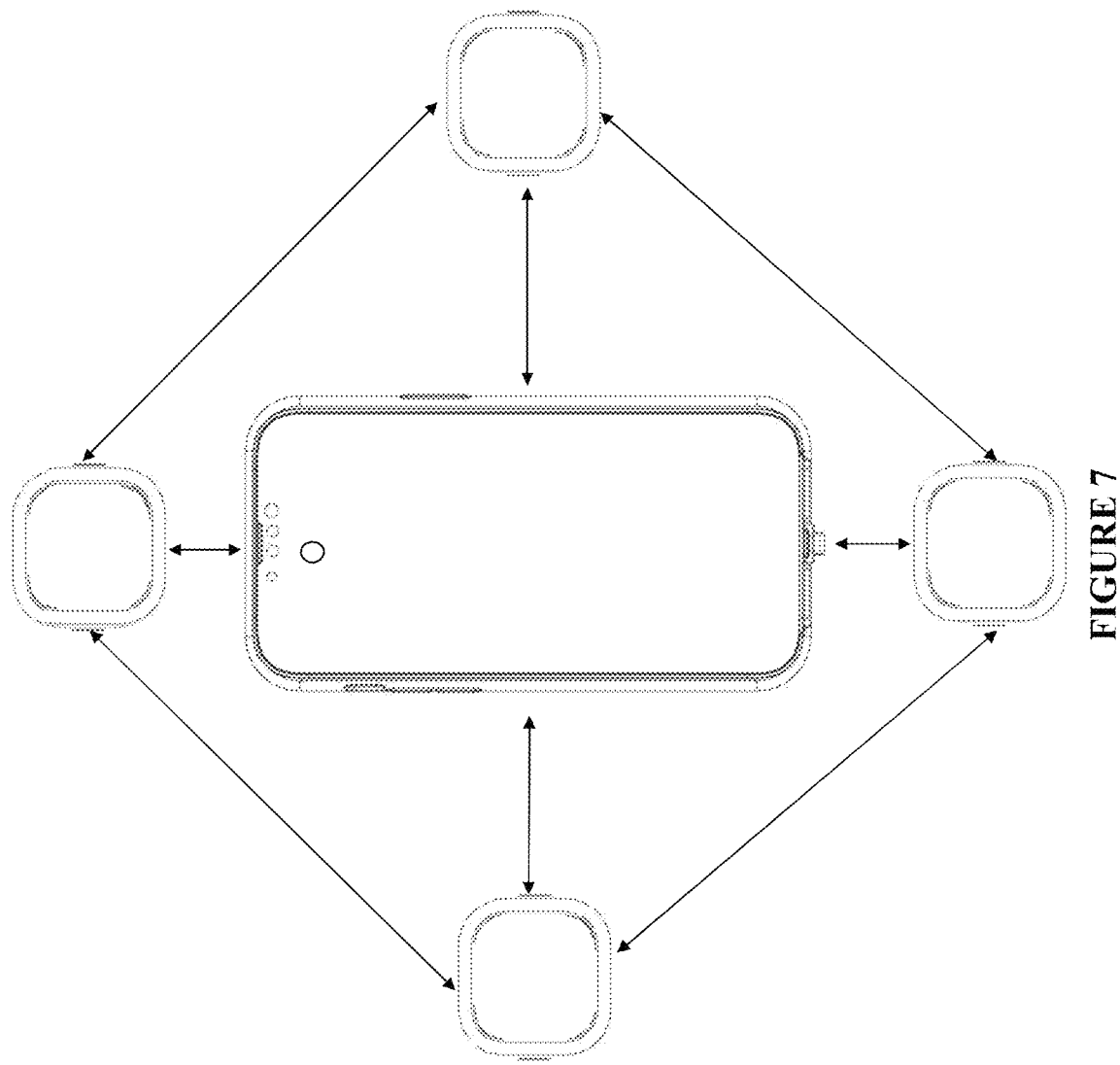

SYSTEMS, DEVICES, AND METHODS FOR MANAGING IMAGE CAPTURING ILLUMINATION FOR A MOBILE DEVICE

CROSS-REFERENCE TO RELATED APPLICATIONS

The present application is a divisional application of the U.S. Non-Provisional patent application Ser. No. 17/538,590 filed 30 Nov. 2021, and the disclosure of which is incorporated herein by reference in its entirety.

TECHNICAL FIELD

The present disclosure relates generally to image capturing illumination, and more specifically, to systems, devices, and methods for managing image capturing illumination for a mobile device.

BACKGROUND

The use of mobile devices has become increasingly widespread around the world, with many users even having more than one mobile device. Perhaps the most commonly used and/or important feature of mobile devices is that of capturing images, including still images and video images (collectively used herein as "images"). While mobile device manufacturers continue their efforts to improve image capturing features and performance, such as by way of upgrading and/or improving hardware and/or software, problems continue to exist in the capturing of images, particularly when capturing images under low light conditions.

BRIEF SUMMARY

The present disclosure relates generally to systems, devices, and methods for addressing conventional problems, including those described above and in the present disclosure, and more specifically, example embodiments relate to systems, subsystems, processors, devices, apparatuses, products, logic, methods, and processes for managing image capturing illumination for mobile devices (e.g., providing illumination to subjects, objects, surroundings, etc. when a mobile device is capturing an image).

In an exemplary embodiment, a system for managing image capturing illumination for a mobile device is described. The system may be for use in providing image capturing illumination for a mobile device. The mobile device may include a rear image capturing subsystem provided at a rear side of the mobile device for enabling the mobile device to capture an image of a subject when the rear side of the mobile device is facing the subject. The mobile device may also include a front image capturing subsystem provided at a front side of the mobile device for enabling the mobile device to capture an image of the subject when the front side of the mobile device is facing the subject. The system may include a main housing assembly and an illumination assembly. The main housing assembly may be configurable or configured to secure to at least a portion of the mobile device. The main housing assembly may include a main housing body securable to the mobile device. The main housing assembly may also include an image capturing opening. The image capturing opening may be an opening formed through the main housing body for the rear image capturing subsystem of the mobile device. The main housing assembly may also include a main housing securing assembly. The main housing securing assembly may be secured to the main housing body. The illumination assembly may be securable to the main housing assembly. The illumination assembly may include an illumination body. The illumination body may include a rear illumination body side and a front illumination body side. The rear illumination body side may face a first direction. The front illumination body side may face a second direction. The illumination assembly may also include an illumination securing assembly. The illumination securing assembly may be configurable or configured to secure the illumination body to the main housing securing assembly. The illumination securing assembly may be further configurable or configured to enable the illumination body to move between a first position and a second position relative to the main housing body. The first position may be a position in which a distance between a center axis of the illumination body and a center axis of the rear image capturing subsystem is a first distance. The second position may be a position in which a distance between the center axis of the illumination body and the center axis of the rear image capturing subsystem is a second distance. The second distance may be greater than the first distance. The illumination assembly may also include a rear side illumination source. The rear side illumination source may be provided on the rear illumination body side of the illumination body. The rear side illumination source may be configurable or configured to transition between providing image capturing illumination and not providing image capturing illumination. The illumination assembly may also include a front side illumination source. The front side illumination source may be provided on the front illumination body side of the illumination body. The front side illumination source may be configurable or configured to transition between providing image capturing illumination and not providing image capturing illumination. The illumination assembly may also include an illumination controller. The illumination controller may be configurable or configured to establish a communication channel with the mobile device. The illumination controller may also be configurable or configured to determine whether the rear image capturing subsystem of the mobile device is activated to capture an image. Responsive to a determination, by the illumination controller, that the rear image capturing subsystem of the mobile device is activated to capture an image, the illumination controller may be configurable or configured to control the rear side illumination source to provide image capturing illumination in the first direction. The illumination controller may also be configurable or configured to determine whether the front image capturing subsystem of the mobile device is activated to capture an image. Responsive to a determination, by the illumination controller, that the front image capturing subsystem of the mobile device is activated to capture an image and the illumination body is not in the first position, the illumination controller may be configurable or configured to control the front side illumination source to provide image capturing illumination in the second direction.

In another exemplary embodiment, a system for managing image capturing illumination for a mobile device is described. The system may be for use in providing image capturing illumination for a mobile device. The mobile device may include a rear image capturing subsystem provided at a rear side of the mobile device for enabling the mobile device to capture an image of a subject when the rear side of the mobile device is facing the subject. The mobile device may also include a front image capturing subsystem provided at a front side of the mobile device for enabling the mobile device to capture an image of the subject when the front side of the mobile device is facing the subject. The system may include a main housing assembly and an illumination assembly. The main housing assembly may be configurable or configured to secure to at least a portion of the mobile device. The illumination assembly may be securable to the main housing assembly. The illumination assembly may include an illumination body. The illumination body may include a rear illumination body side and a front illumination body side. The illumination assembly may also include an illumination securing assembly. The illumination securing assembly may be configurable or configured to secure the illumination body to the main housing assembly. The illumination securing assembly may be further configurable or configured to enable the illumination body to move between a first position and a second position relative to the main housing assembly. The illumination assembly may also include a rear side illumination source. The rear side illumination source may be provided on the rear illumination body side of the illumination body. The rear side illumination source may be configurable or configured to transition between providing image capturing illumination and not providing image capturing illumination. The illumination assembly may also include a front side illumination source. The front side illumination source may be provided on the front illumination body side of the illumination body. The front side illumination source may be configurable or configured to transition between providing image capturing illumination and not providing image capturing illumination. The illumination assembly may also include an illumination controller. The illumination controller may be configurable or configured to control the rear side illumination source to provide image capturing illumination. Alternatively or in addition, the illumination controller may also be configurable or configured to control the front side illumination source to provide image capturing illumination. Alternatively or in addition, the illumination controller may also be configurable or configured to control both the rear side illumination source and the front side illumination source to provide image capturing illumination. Alternatively or in addition, the illumination controller may also be configurable or configured to control both the rear side illumination source and the front side illumination source to not provide image capturing illumination.

In another exemplary embodiment, a system for managing image capturing illumination for a mobile device is described. The system may be for use in providing image capturing illumination for a mobile device. The mobile device may include a rear image capturing subsystem provided at a rear side of the mobile device for enabling the mobile device to capture an image of a subject when the rear side of the mobile device is facing the subject. The mobile device may also include a front image capturing subsystem provided at a front side of the mobile device for enabling the mobile device to capture an image of the subject when the front side of the mobile device is facing the subject. The system may include a main housing assembly and an illumination assembly. The main housing assembly may be configurable or configured to secure to at least a portion of the mobile device. The main housing assembly may include a main housing body securable to the mobile device. The main housing assembly may also include an image capturing opening. The image capturing opening may be an opening formed through the main housing body for the rear image capturing subsystem of the mobile device. The main housing assembly may also include a main housing securing assembly. The main housing securing assembly may be secured to the main housing body. The illumination assembly may be securable to the main housing assembly. The illumination assembly may include an illumination body. The illumination body may include a rear illumination body side and a front illumination body side. The rear illumination body side may face a first direction. The front illumination body side may face a second direction. The first direction may be different from the second direction. The illumination assembly may also include an illumination securing assembly. The illumination securing assembly may be configurable or configured to secure the illumination body to the main housing securing assembly. The illumination securing assembly may be further configurable or configured to enable the illumination body to move between a first position and a second position relative to the main housing body while remaining secured to the main housing securing assembly. The illumination assembly may also include a rear side illumination source. The rear side illumination source may be provided on the rear illumination body side of the illumination body. The rear side illumination source may be configurable or configured to selectively transition between providing image capturing illumination in the first direction and not providing image capturing illumination in the first direction based on information obtained from the mobile device. The illumination assembly may also include a front side illumination source. The front side illumination source may be provided on the front illumination body side of the illumination body. The front side illumination source may be configurable or configured to transition between providing image capturing illumination in the second direction and not providing image capturing illumination in the second direction based on information obtained from the mobile device.

BRIEF DESCRIPTION OF THE FIGURES

For a more complete understanding of the present disclosure, example embodiments, and their advantages, reference is now made to the following description taken in conjunction with the accompanying figures, in which like reference numbers indicate like features, and:

FIG. 3A illustrates a front view of an example embodiment of the illumination assembly, which depicts the front side of the illumination assembly;

FIG. 3B illustrates a rear view of an example embodiment of the illumination assembly, which depicts the rear side of the illumination assembly;

FIG. 3C illustrates a side view of an example embodiment of the illumination assembly, which depicts a side wall of the illumination assembly;

FIG. 3D illustrates a view of an example embodiment of the front and/or rear side illumination sources secured to the front side and/or rear side, respectively, of the illumination assembly;

FIG. 4D illustrates a front view of an example embodiment of a system for managing image capturing illumination for a mobile device wherein the illumination assembly is in a second position;

FIG. 5A illustrates a rear view of an example embodiment of a system for managing image capturing illumination for a mobile device wherein the illumination assembly is secured to a left side of the main housing body;

FIG. 5B illustrates a rear view of an example embodiment of a system for managing image capturing illumination for a mobile device wherein the illumination assembly is secured to a right side of the main housing body;

FIG. 5C illustrates a rear view of an example embodiment of a system for managing image capturing illumination for a mobile device wherein a plurality of illumination assemblies are secured to a left side, right side, top side, and bottom side of the main housing body;

FIG. 7 illustrates a front view of an example embodiment of a system for managing image capturing illumination for a mobile device wherein a plurality of illumination assemblies are unsecured from the main housing body and wirelessly communicating with each other and/or with the mobile device housed in the main housing assembly;

Although similar reference numbers may be used to refer to similar elements in the figures for convenience, it can be appreciated that each of the various example embodiments may be considered to be distinct variations.

Example embodiments will now be described with reference to the accompanying figures, which form a part of the present disclosure and which illustrate example embodiments which may be practiced. As used in the present disclosure and the appended claims, the terms "embodiment," "example embodiment," "exemplary embodiment," and "present embodiment" do not necessarily refer to a single embodiment, although they may, and various example embodiments may be readily combined and/or interchanged without departing from the scope or spirit of example embodiments. Furthermore, the terminology as used in the present disclosure and the appended claims is for the purpose of describing example embodiments only and is not intended to be limitations. In this respect, as used in the present disclosure and the appended claims, the term "in" may include "in" and "on," and the terms "a," "an," and "the" may include singular and plural references. Furthermore, as used in the present disclosure and the appended claims, the term "by" may also mean "from," depending on the context. Furthermore, as used in the present disclosure and the appended claims, the term "if" may also mean "when" or "upon," depending on the context. Furthermore, as used in the present disclosure and appended claims, the words "and/or" may refer to and encompass any or all possible combinations of one or more of the associated listed items.

DETAILED DESCRIPTION

Present example embodiments relate generally to and/or include systems, subsystems, processors, devices, logic, methods, and processes for addressing conventional problems, including those described above and in the present disclosure, and more specifically, example embodiments relate to systems, subsystems, processors, devices, logic, methods, and processes for managing image capturing illumination for mobile devices. For example, embodiments described herein relate to systems for providing illumination to subjects, objects, surroundings, etc. when a mobile device is capturing an image.

It is to be understood that, while example embodiments are mostly described in the present disclosure as pertaining to systems, subsystems, processors, devices, logic, methods, and processes for managing image capturing illumination for mobile devices, the principles described in the present disclosure may also be applied beyond the context of providing illumination for mobile devices when capturing images, such as providing of illumination for other forms/types of devices, providing distance/depth/size estimations (e.g., via LiDAR sensors), etc., without departing from the teachings of the present disclosure.

Example embodiments will now be described below with reference to the accompanying figures, which form a part of the present disclosure.

Example Embodiments of a System for Managing Image Capturing Illumination for a Mobile Device (e.g., System 100)

Figure 1:
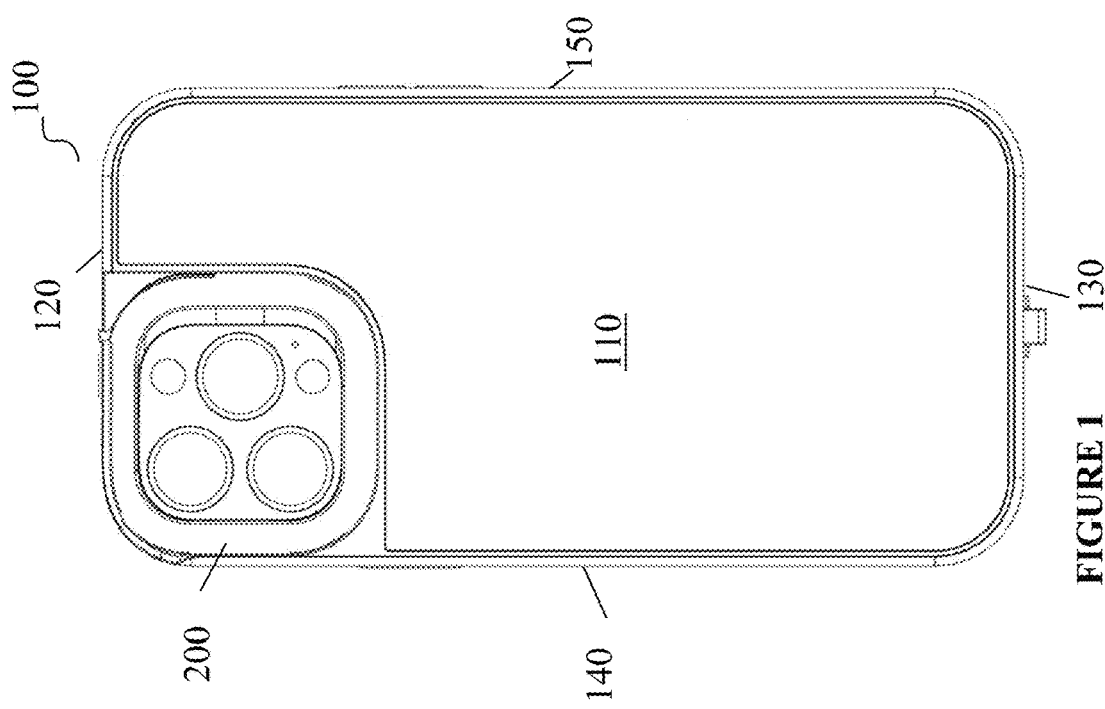
FIG. 1 illustrates a rear view of an example embodiment of a system for managing image capturing illumination for a mobile device.

FIG. 1 illustrates an example embodiment of a system (e.g., system 100) for managing image capturing illumination for a mobile device. For example, the system 100 may be configurable or configured to provide illumination for a mobile device (e.g., mobile device 10, as illustrated in FIGS. 4A-D, 6, and 7) when the mobile device 10 is being used to capture images. Alternatively or in addition, the system 100 may be configurable or configured to increase and/or improve the luminance and/or brightness of one or more subjects, objects, surroundings, or the like, so as to improve the images captured by the mobile device 10. Alternatively or in addition, the system 100 may be configurable or configured to alter, adjust, and/or change illumination of one or more subjects, objects, surroundings, or the like, such as by adjusting and/or directing one or more colors of light to one or more subjects, objects, surroundings, or the like.

An example embodiment of the system 100 includes a main housing assembly (e.g., main housing assembly 110). The main housing assembly 110 is configurable or configured to house, attach to, receive, and/or otherwise secure to at least a portion of a mobile device 10. The main housing assembly 110 will be further described in the present disclosure.

The system 100 may also include an illumination assembly (e.g., illumination assembly 200). In an example embodiment, the illumination assembly 200 is secured to the main housing assembly 110. The illumination assembly 200 may be configurable or configured in such a way that the illumination assembly 200 is movable, transitionable, slideable, flippable, and/or actuatable relative to the main housing assembly 110. As will be further described in the present disclosure, such moving, transitioning, sliding, flipping, and/or otherwise actuating of the illumination assembly 200 may be via one or more other elements of the system 100.

Figure 2:
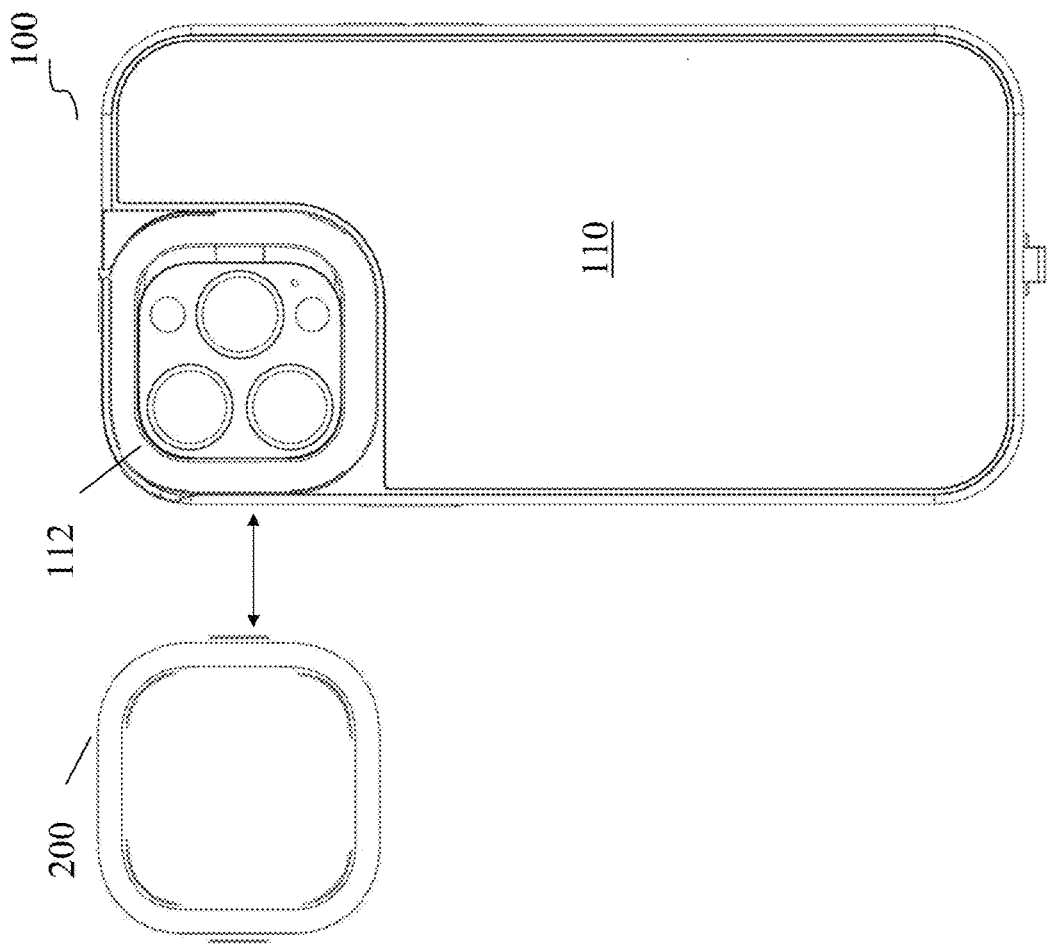
FIG. 2 illustrates a rear view of an example embodiment of a system for managing image capturing illumination for a mobile device wherein the illumination assembly is unsecured or detached from the main housing body.
Figure 4C:
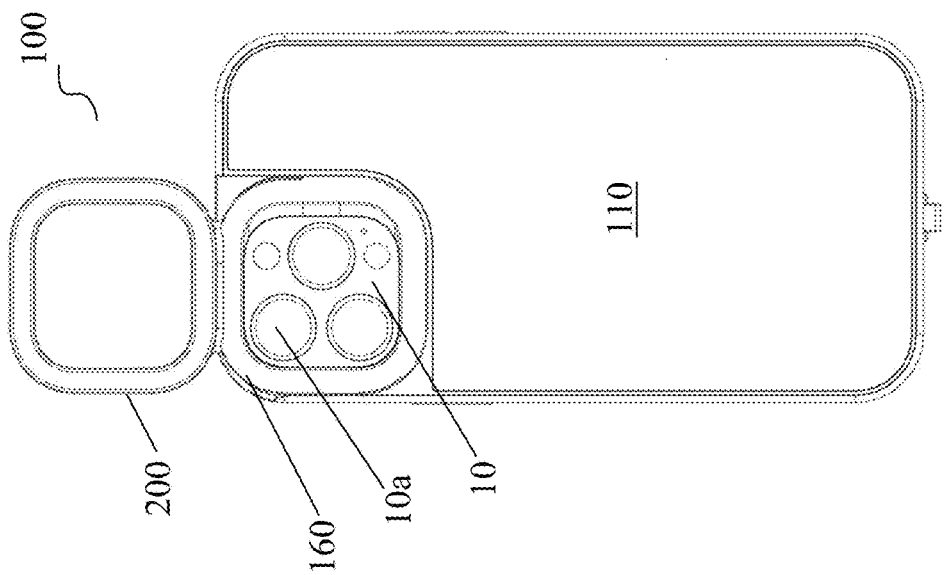
FIG. 4C illustrates a rear view of an example embodiment of a system for managing image capturing illumination for a mobile device wherein the illumination assembly is in a second position.
Figure 4B:
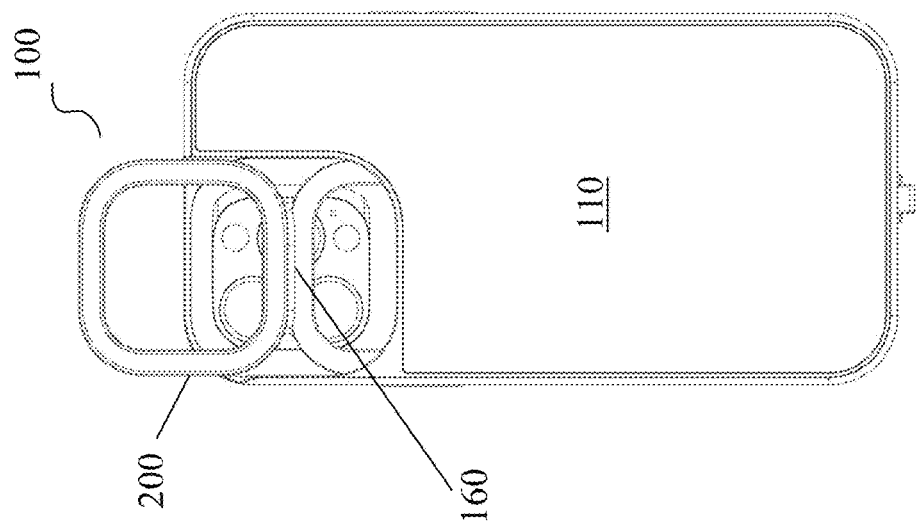
FIG. 4B illustrates a rear view of an example embodiment of a system for managing image capturing illumination for a mobile device wherein the illumination assembly is being further moved from a first or default position.
Figure 4A:
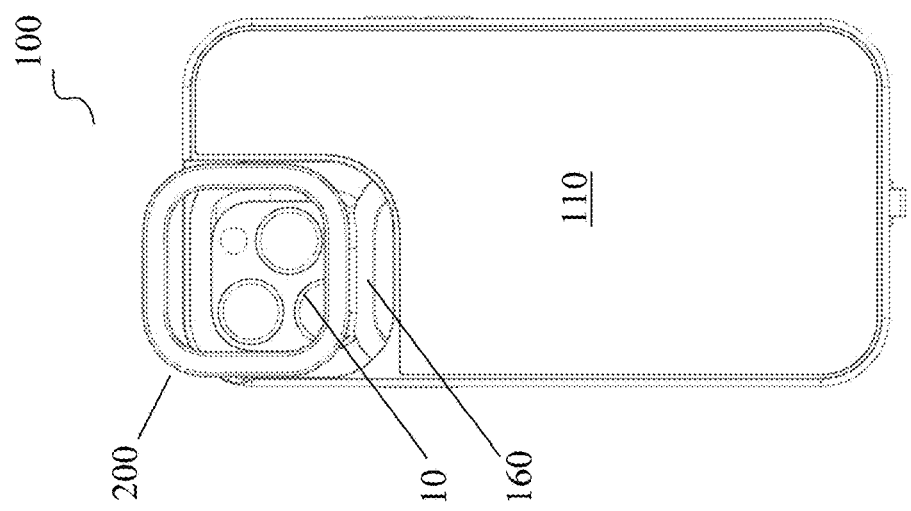
FIG. 4A illustrates a rear view of an example embodiment of a system for managing image capturing illumination for a mobile device wherein the illumination assembly is being moved from a first or default position.

For example, as illustrated in FIG. 1 and at least FIGS. 4A-C, the illumination assembly 200 may be configurable or configured to move or transition from a first position (as illustrated in FIG. 1) to a second position (as illustrated in FIG. 4C), such as via intermediate positions (such as those illustrated in FIGS. 4A-B). Alternatively or in addition, the illumination assembly 200 may be configurable or configured to move from a first position (as illustrated in FIG. 1) to a second position (as illustrated in FIG. 5A), such as via sliding or flipping of the illumination assembly 200. Alternatively or in addition, the illumination assembly 200 may be configurable or configured to move from a first position (as illustrated in FIG. 4C) to a second position (as illustrated in FIG. 5A), such as by rotating the illumination assembly 200 in a counter-clockwise direction. Alternatively or in addition, the illumination assembly 200 may be configurable or configured to move from a first position (as illustrated in FIG. 1) to a second position (as illustrated in FIG. 2), such as by separating or unsecuring from the main housing assembly 110 altogether. The illumination assembly 200 will be further described in the present disclosure.

The mobile device 10, which is housed, attached to, and/or secured to the main housing assembly 110, may be any mobile or portable device having image capturing capabilities including, but not limited to, a mobile phone, smart phone, tablet, phablet, digital camera, digital image recorder, etc. The mobile device 10 may include a rear image capturing subsystem 10a (see, for example, FIG. 4C). The rear image capturing subsystem 10a may be provided at a location on a rear side of the mobile device 10. When the rear side of the mobile device 10 is facing a subject, object, etc., the mobile device 10 is controllable by a user to capture an image and/or video of the subject, object, etc. via the rear image capturing subsystem 10a. The mobile device 10 may further include a front image capturing subsystem 10b (see, for example, FIG. 4D). The front image capturing subsystem 10b may be provided at a front side of the mobile device 10. When the front side of the mobile device 10 is facing an subject, object, etc., the mobile device 10 is controllable by a user to capture an image and/or video of the subject, object, etc. via the front image capturing subsystem 10b.

As will be further described in the present disclosure, a non-limiting example embodiment of the system 100 may include a main housing assembly 110 and one or more illumination assemblies 200. The main housing assembly 110 may be configurable or configured to secure to at least a portion of the mobile device 10. The main housing assembly 110 may include a main housing body 110 securable to the mobile device 10. The main housing assembly 110 may also include an image capturing opening 112. The image capturing opening 112 may be an opening, or the like, formed through the main housing body 110 for the rear image capturing subsystem 10a of the mobile device 10. The main housing assembly 110 may also include a main housing securing assembly 160. The main housing securing assembly 160 may be secured to the main housing body 110.

Regarding the illumination assembly 200, the illumination assembly 200 may be securable to (and in some embodiments, unsecurable from) the main housing assembly 110. The illumination assembly 200 may include an illumination body 200. The illumination body 200 may include a rear illumination body side 220 and a front illumination body side 210. The rear illumination body side 220 may face a first direction. The front illumination body side 210 may face a second direction.

The illumination assembly 200 may also include an illumination securing assembly 230. The illumination securing assembly 230 may be configurable or configured to secure the illumination body 200 to the main housing securing assembly 160. The illumination securing assembly 230 may be further configurable or configured to enable the illumination body 200 to move between a first position and a second position relative to the main housing body 110. The first position may be a position in which a distance between a center axis of the illumination body 200 and a center axis of the rear image capturing subsystem 10a is a first distance. The second position may be a position in which a distance between the center axis of the illumination body 200 and the center axis of the rear image capturing subsystem 10a is a second distance. The second distance may be greater than the first distance.

The illumination assembly 200 may also include a rear side illumination source 240. The rear side illumination source 240 may be provided on the rear illumination body side 220 of the illumination body 200. The rear side illumination source 240 may be configurable or configured to transition between providing image capturing illumination and not providing image capturing illumination.

The illumination assembly 200 may also include a front side illumination source 240. The front side illumination source 240 may be provided on the front illumination body side 210 of the illumination body 200. The front side illumination source 240 may be configurable or configured to transition between providing image capturing illumination and not providing image capturing illumination.

The illumination assembly 200 may also include an illumination controller (not shown). The illumination controller may be configurable or configured to establish a communication channel with the mobile device 10. The illumination controller may also be configurable or configured to determine whether the rear image capturing subsystem 10a of the mobile device 10 is activated to capture an image. Responsive to a determination, by the illumination controller, that the rear image capturing subsystem 10a of the mobile device 10 is activated to capture an image, the illumination controller may be configurable or configured to control the rear side illumination source 240 to provide image capturing illumination in the first direction. The illumination controller may also be configurable or configured to determine whether the front image capturing subsystem 10b of the mobile device 10 is activated to capture an image. Responsive to a determination, by the illumination controller, that the front image capturing subsystem 10b of the mobile device 10 is activated to capture an image and the illumination body 200 is not in the first position (e.g., a position illustrated in at least FIG. 1), the illumination controller may be configurable or configured to control the front side illumination source 10b to provide image capturing illumination in the second direction.

As will be further described in the present disclosure, another non-limiting example embodiment of the system 100 may include a main housing assembly 110 and one or more illumination assemblies 200. The main housing assembly 110 may be configurable or configured to secure to at least a portion of the mobile device 10. The illumination assembly 200 may be securable to the main housing assembly 110.

Regarding the illumination assembly 200, the illumination assembly 200 may include an illumination body 200.

The illumination body 200 may include a rear illumination body side 220 and a front illumination body side 210. The illumination assembly 200 may also include an illumination securing assembly 230. The illumination securing assembly 230 may be configurable or configured to secure the illumination body 200 to the main housing assembly 110. The illumination securing assembly 230 may be further configurable or configured to enable the illumination body 200 to move between a first position and a second position relative to the main housing assembly 110.

The illumination assembly 200 may also include a rear side illumination source 240. The rear side illumination source 240 may be provided on the rear illumination body side 220 of the illumination body 200. The rear side illumination source 240 may be configurable or configured to transition between providing image capturing illumination and not providing image capturing illumination.

The illumination assembly 200 may also include a front side illumination source 240. The front side illumination source 240 may be provided on the front illumination body side 210 of the illumination body 200. The front side illumination source 240 may be configurable or configured to transition between providing image capturing illumination and not providing image capturing illumination.

The illumination assembly 200 may also include an illumination controller (not shown). The illumination controller may be configurable or configured to control the rear side illumination source 240 to provide image capturing illumination. Alternatively or in addition, the illumination controller may also be configurable or configured to control the front side illumination source 240 to provide image capturing illumination. Alternatively or in addition, the illumination controller may also be configurable or configured to control both the rear side illumination source 240 and the front side illumination source 240 to provide image capturing illumination. Alternatively or in addition, the illumination controller may also be configurable or configured to control both the rear side illumination source 240 and the front side illumination source 240 to not provide image capturing illumination.

As will be further described in the present disclosure, another non-limiting example embodiment of the system 100 may include a main housing assembly 110 and one or more illumination assemblies 200. The main housing assembly 110 may be configurable or configured to secure to at least a portion of the mobile device 10. The main housing assembly 110 may include a main housing body 110 securable to the mobile device 10. The main housing assembly 110 may also include an image capturing opening 112. The image capturing opening 112 may be an opening formed through the main housing body 110 for the rear image capturing subsystem 10a of the mobile device 10. The main housing assembly 110 may also include a main housing securing assembly 160. The main housing securing assembly 160 may be secured to the main housing body 110.

Regarding the illumination assembly 200, the illumination assembly 200 may be securable to the main housing assembly 110. The illumination assembly 200 may include an illumination body 200. The illumination body 200 may include a rear illumination body side 220 and a front illumination body side 210. The rear illumination body side 220 may face a first direction. The front illumination body side 210 may face a second direction. The first direction may be different from the second direction. The illumination assembly 200 may also include an illumination securing assembly 230. The illumination securing assembly 230 may be configurable or configured to secure the illumination body 200 to the main housing securing assembly 110. The illumination securing assembly 230 may be further configurable or configured to enable the illumination body 200 to move between a first position and a second position relative to the main housing body 110 while remaining secured to the main housing securing assembly 160.

The illumination assembly 200 may also include a rear side illumination source 240. The rear side illumination source 240 may be provided on the rear illumination body side 220 of the illumination body 200. The rear side illumination source 220 may be configurable or configured to selectively transition between providing image capturing illumination in the first direction and not providing image capturing illumination in the first direction based on information obtained from the mobile device 10.

The illumination assembly 200 may also include a front side illumination source 240. The front side illumination source 240 may be provided on the front illumination body side 210 of the illumination body 200. The front side illumination source 240 may be configurable or configured to transition between providing image capturing illumination in the second direction and not providing image capturing illumination in the second direction based on information obtained from the mobile device 10.

Example embodiments of the system 100 and elements thereof will now be further described with reference to the accompanying figures, which form a part of the present disclosure.

Example Embodiments of the Main Housing Assembly (e.g., Main Housing Assembly 110)

As illustrated in at least FIGS. 1 and 2, the system 100 includes a main housing assembly (e.g., main housing assembly 110). The main housing assembly 110 is configurable or configured to house, attach to, receive, and/or otherwise secure to at least a portion of a mobile device 10.

As further described below and in the present disclosure, the main housing assembly 110 may include a main housing body 110. In an example embodiment, the main housing body 110 may resemble and/or be form as a protective cover, protective case, protective body, or the like, for the mobile device 10. As illustrated in FIG. 1, the main housing body 110 may include a top side 120. The main housing body 110 may also include a bottom side 130, which may be opposite to the top side 120. The main housing body 110 may also a left side 140. The main housing body 110 may also include a right side 150, which may be opposite to the left side 140. The main housing body 110 may also include an exterior rear side (e.g., as illustrated in at least FIGS. 1 and 2 as 110). The main housing body 110 may also include an interior front side (not shown) that faces the rear side of the mobile device 10 (which may be opposite to the exterior rear side). Collectively, the wall having the exterior rear side and the interior front side is referred to herein as the rear main housing body wall, which covers at least a portion of the rear side of the mobile device 10. It is to be understood that the main housing body 110 may or may not be formed as a unitary body. It is also to be understood in the present disclosure that the main housing body 110 may be formed in any shape, size, thickness, and/or material. In this regard, the shape and/or size of the main housing body 110 will generally be based on the make and/or model of mobile device 10.

As illustrated in FIG. 2, the main housing assembly 110 may also include one or more image capturing openings 112. In an example embodiment, the image capturing opening 112 may be formed in a shape and/or size consistent with and/or corresponding to a shape, size, configuration, number of lenses, number of sensors, etc. of the rear image capturing subsystem 10a of the mobile device 10. For example, the image capturing opening 112 may be formed in a shape that resembles one or more geometric shapes. As another example, the image capturing opening 112 may be formed in a shape that resembles a square (or square with rounded corners). The image capturing opening 112 may also be formed in a shape that resembles a rectangle (or a rectangle with rounded corners). The image capturing opening 112 may also be formed in a shape that resembles a circle. image capturing opening 112 may also be formed in a shape that resembles an oval. Other shapes are also contemplated without departing from the teachings of the present disclosure.

As illustrated in at least FIGS. 4A-C, the main housing assembly 110 may also include one or more main housing securing assemblies 160. Each main housing securing assembly 160 is secured to the main housing body 110 at one end. In some example embodiments, each main housing securing assembly 160 is securable to and unsecurable from the main housing body 110. Each main housing securing assembly 160 is also secured to one or more illumination assemblies 200 at another end. In some example embodiments, each main housing securing assembly 160 is securable to and unsecurable from one or more illumination assemblies 200.

For example, as illustrated in FIGS. 4A-C, the main housing securing assembly 160 may be in a shape resembling the illumination assembly 200, and may be configurable or configured to move, transition, slide, and/or actuate relative to the main housing body 110. Such moving, transitioning, sliding, and/or actuating may be performed in one or more of a plurality of ways. For example, the main housing securing assembly 160 may include and/or be in contact and/or communication with one or more internal rails, channels, grooves, or the like (not shown) (also referred to herein as an elongated receiving assembly), formed on and/or secured to the interior front side of the main housing body 110. Such elongated receiving assembly (not shown) may include a first end (e.g., closer to and/or adjacent to the image capturing opening) and a second end (closer to the bottom side 130 than the first end). The main housing securing assembly 160 in such example may be secured and/or securable to an illumination assembly 200, and may restrict movement of the illumination assembly 200 to be between the first and second ends of the elongated receiving assembly.

In an example embodiment, the main housing securing assembly 160 may also be formed as an integral part of and/or embedding within a wall of the main housing body 110. For example, FIG. 5B illustrates an illumination assembly 200 secured to a portion of the right side 150 of the main housing body 110. In such an example, the main housing securing assembly 160 (not shown in FIG. 5B) may be in the form of a magnet or the like, which secures to the illumination securing assembly 230 of the illumination assembly 200. As another example, FIG. 5C illustrates a plurality of other locations where one or more illumination assemblies 200 can be secured to the main housing body 110 via the main housing securing assembly 160. In this regard, a plurality of main housing securing assemblies 160 may be formed in a plurality of locations on one, some, or all side walls of the main housing body 110.

In an example embodiment, the main housing securing assembly 160 may be formed in such a way as to allow an illumination assembly 200 to be positioned parallel to the main housing body 110. FIG. 8A illustrates a side view of such an example embodiment, although the main housing securing assembly 160 is not shown in FIG. 8A. The main housing securing assembly 160 may also be formed in such a way as to allow a positioning of an illumination assembly 200 to be adjustable.

Figure 8B:
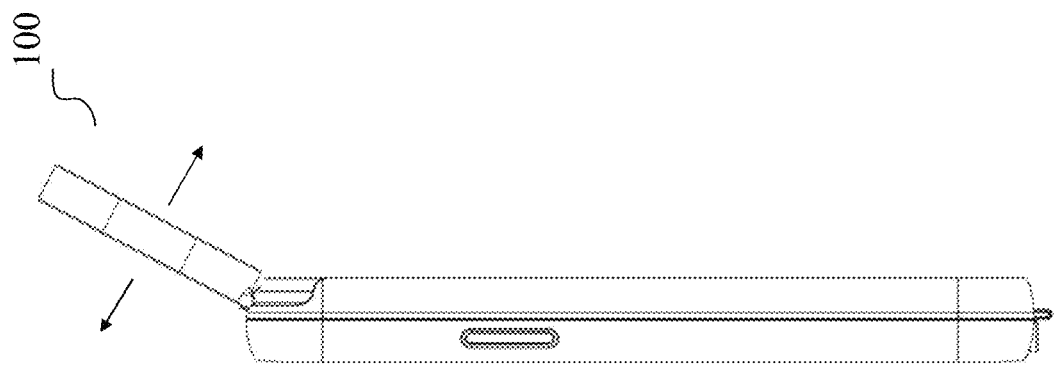
FIG. 8B illustrates a side view of an example embodiment of a system for managing image capturing illumination for a mobile device wherein an illumination assembly is positioned above the mobile device and an orientation of the illumination assembly is adjusted.
Figure 8A:
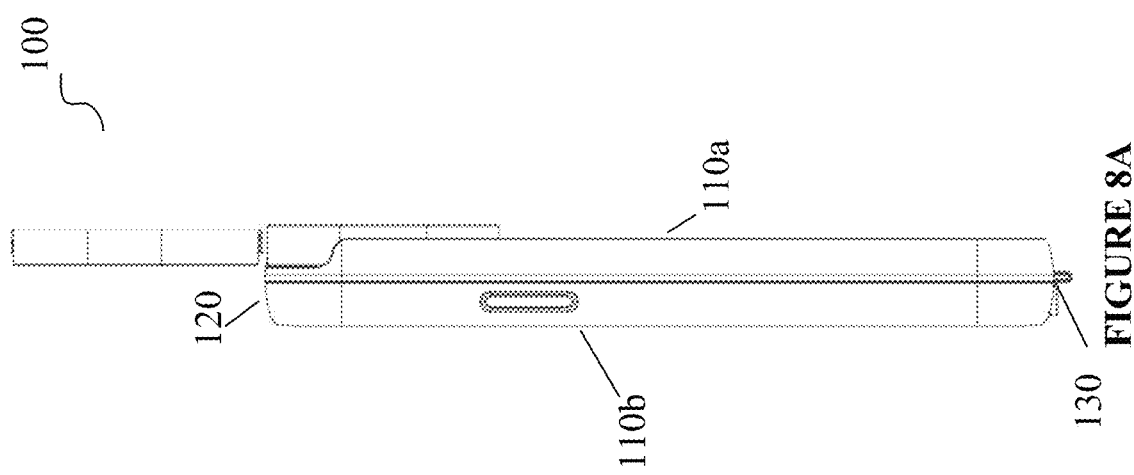
FIG. 8A illustrates a side view of an example embodiment of a system for managing image capturing illumination for a mobile device wherein an illumination assembly is positioned above the mobile device.

For example, FIG. 8B illustrates an example of an adjusted position of the illumination assembly 200 relative to the main housing body 110, which has been rotated in a clockwise direction in the Figure relative to the position illustrated in FIG. 8A. It is to be understood in the present disclosure that the main housing securing assembly 160 may be configurable or configured in such a way that the position of the illumination assembly 200 relative to the main housing body 110 may be further adjusted in a clockwise direction as compared to the position illustrated in FIG. 8B. It is also to be understood in the present disclosure that the main housing securing assembly 160 may be configurable or configured in such a way that the position of the illumination assembly 200 relative to the main housing body 110 may be further adjusted in a counter-clockwise direction as compared to the position illustrated in FIG. 8B. It is also to be understood in the present disclosure that the main housing securing assembly 160 may be configurable or configured in such a way that the position of the illumination assembly 200 relative to the main housing body 110 may be further adjusted in a counter-clockwise direction as compared to the position illustrated in FIG. 8A. It is also to be understood that such adjusting of a positioning of the illumination assembly 200 relative to the main housing body 110, as described above and illustrated in FIGS. 8A and 8B for a main housing securing assembly 160 provided on the top side 120 of the main housing body 110, may also be provided and/or available for one or more other sides of the main housing body 110 (e.g., bottom side 130, left side 140, and/or right side 150) without departing from the teachings of the present disclosure. In such example embodiments, the main housing securing assembly 160 will also be provided on such one or more other sides of the main housing body 110.

Example Embodiments of the Illumination Assembly (e.g., Illumination Assembly 200)

As illustrated in FIGS. 1-8, an example embodiment of the system 100 includes one or more illumination assemblies (e.g., illumination assembly 200). The illumination assembly 200 may be configurable or configured in such a way as to be movable, transitionable, slideable, flippable, and/or actuatable relative to the main housing assembly 110. Such moving, transitioning, sliding, flipping, and/or otherwise actuating of the illumination assembly 200 may be via one or more other elements of the system 100, including the main housing securing assembly 160, the illumination securing assembly 230, and/or one or more other elements.

For example, as illustrated in at least FIGS. 1 and 4A-C, the illumination assembly 200 may be configurable or configured to move or transition from a first position (as illustrated in FIG. 1) to a second position (as illustrated in FIG. 4C). Such move or transition may be performed directly and/or via one or more intermediate positions (such as those illustrated in FIGS. 4A-B). Alternatively or in addition, the illumination assembly 200 may be configurable or configured to move from a first position (as illustrated in FIG. 1) to a second position (as illustrated in FIG. 5A), such as via sliding or flipping of the illumination assembly 200.

Alternatively or in addition, the illumination assembly 200 may be configurable or configured to move from a first position (as illustrated in FIG. 4C) to a second position (as illustrated in FIG. 5A), such as by rotating the illumination assembly 200 in a counter-clockwise direction. Alternatively or in addition, the illumination assembly 200 may be configurable or configured to move from a first position (as illustrated in FIG. 1) to any second position illustrated in FIG. 5C, such as by separating or unsecuring from the main housing assembly 110 and re-securing to the main housing assembly 110 at the desired position. Alternatively or in addition, the illumination assembly 200 may be configurable or configured to adjust an orientation from a first orientation (as illustrated in FIG. 8A) to a second orientation (as illustrated in FIG. 8B). Alternatively or in addition, the illumination assembly 200 may be configurable or configured to move from a first position (as illustrated in FIG. 1) to a second position (as illustrated in FIG. 2), such as by separating or unsecuring from the main housing assembly 110 altogether. Alternatively or in addition, the illumination assembly 200 may be configurable or configured to move from a first position (as illustrated in FIG. 1) to any second position illustrated in FIG. 6, such as by separating or unsecuring from the main housing assembly 110 altogether.

As further described below and in the present disclosure, the illumination assembly 200 may include an illumination body 200. As illustrated in FIG. 3A, the illumination body 200 may include a front side 210. As illustrated in FIG. 3B, the illumination body 200 may include a rear side 220. As illustrated in FIG. 3C, the illumination assembly 200 may also include an illumination securing assembly 230 secured to, embedded in, and/or otherwise provided in/on one or more side walls of the illumination body 200. The illumination assembly 200 may also include a rear side illumination source formed on and/or secured to the rear side 200 of the illumination body 200. The illumination assembly 200 may also include a front side illumination source formed on and/or secured to the front side 210 of the illumination body 200. The illumination assembly 200 may also include an illumination controller (not shown) embedding in, secured to, and/or otherwise provided with the illumination body 200.

Example embodiments of the illumination assembly 200 and elements thereof will now be further described with reference to the accompanying figures, which form a part of the present disclosure.

Example Embodiments of the Illumination Body (e.g., Illumination Body 200)

In an example embodiment, the illumination assembly 200 includes one or more illumination bodies (e.g., illumination body 200). The illumination body 200 may be configurable or configured to secure to the main housing body 110. The illumination body 200 may also be unsecured (or detached) from the main housing body 110, such as in embodiments that enable the illumination assembly 200 to be secured to one or more parts of the main housing body 110 (e.g., right side 150, bottom side 130, etc.); and/or in embodiments that enable the illumination assembly 200 to be used without physically attaching or securing to the main housing body 110 (e.g., held in a hand of a user; held via a separate holder, stand, tripod, etc.; placed on a surface; etc.). As will be further described in the present disclosure, the illumination body 200 may be secured to (and in some embodiments, unsecured from) the main housing body 110 via one or more elements of the system 100, including, but not limited to, the illumination securing assembly 230 and/or main housing securing assembly 160.

As illustrated in FIG. 3A, the illumination body 200 may include a front side 210. As illustrated in FIG. 3B, the illumination body 200 may also include a rear side 220, which may be opposite to the front side 210. As illustrated in FIG. 3C, the illumination body 200 may also include one or more other side walls (e.g., the illumination body 200 may have four side walls if the illumination body 200 is formed having a cross-section in the shape of a square, square with rounded corners, or the like, as illustrated in the Figures; the illumination body 200 may have one side wall if the illumination body 200 is formed having a cross-section in the shape of a circle, oval, or the like (not shown); the illumination body 200 may have three side walls if the illumination body 200 is formed having a cross-section in the shape of a triangle, or the like (not shown); etc.). Furthermore, as illustrated in the Figures, the illumination body 200 may include one or more illumination body interior openings or channels 250, which may be configured to at least allow the rear image capturing subsystem 10a of the mobile device 10 to have an unobstructed line of sight for capturing of images. It is to be understood in the present disclosure that the shape of a cross-section of such illumination body interior opening 250 may be any shape and/or size (e.g., circular, oval, square, square with rounded corners, other geometrical shapes, etc.).

In an example embodiment, the illumination body 200 is secured to the main housing body 110. In some example embodiments, the illumination body 200 is securable to and unsecurable from the main housing body 110. For example, as illustrated in at least FIGS. 3A-D, the illumination body 200 may be configurable or configured to move, transition, slide, and/or actuate relative to the main housing body 110. Such moving, transitioning, sliding, and/or actuating may be performed in one or more of a plurality of ways. For example, the illumination body 200 may be secured to (and in example embodiments, unsecurable from) the main housing body 110 via one or more illumination securing assemblies 230 and/or one or more main housing securing assemblies 160 (as described above and in the present disclosure), which enable the moving, transitioning, sliding, and/or actuating of the illumination body 200 relative to the main housing body 110. As described in the present disclosure, such one or more illumination securing assemblies 230 and/or one or more main housing securing assemblies 160 may include and/or be in contact and/or communication with one or more internal rails, channels, grooves, or the like (not shown) (also referred to herein as an elongated receiving assembly), formed on and/or secured to the interior front side of the main housing body 110. Such elongated receiving assembly (not shown) may include a first end (e.g., closer to and/or adjacent to the image capturing opening) and a second end (closer to the bottom side 130 than the first end). The illumination body 200 in such example may be secured and/or securable to the main housing securing assembly 160, which may cooperate to restrict movement of the illumination assembly 200 to be between and/or within the first and second ends of the elongated receiving assembly (when secured to the main housing body 110; but will not be restricted to such movement if the illumination assembly 200 is unsecured from the main housing body 110).

Example Embodiments of the Illumination Securing Assembly (e.g., Illumination Securing Assembly 230)

As illustrated in at least FIG. 3C, the illumination assembly 200 includes one or more illumination securing assemblies (e.g., illumination securing assembly 230). In an example embodiment, the illumination securing assembly 230 may be configurable or configured to secure the illumination body 200 to the main housing securing assembly 160. In example embodiments, the illumination securing assembly 230 may also be configurable or configured to unsecure the illumination body 200 from the main housing body 110 (and the main housing securing assembly 160).

As described above and in the present disclosure, the illumination securing assembly 230 may be configurable or configured to cooperate with the main housing securing assembly 160 to enable the illumination body 200 to move between a first position and a second position relative to the main housing body 110. FIGS. 4A-C illustrate an example embodiment of such movements. For example, the first position may be a position in which a distance between a center axis of the illumination body 230 (as formed through the illumination body interior opening 250) and a center axis of the rear image capturing subsystem 10a of the mobile device 10 (e.g., a center axis of one or more of the lenses of the rear image capturing subsystem 10a being used to capture an image) is a first distance. The second position may be a position in which a distance between the center axis of the illumination body 230 and the center axis of the rear image capturing subsystem 10a is a second distance. In such an example, the second distance is different from the first distance. In such an example, the second distance may be greater than the first distance.

In example embodiment, the illumination securing assembly 230 secured to, embedded in, and/or otherwise provided in/on one or more side walls of the illumination body 200. For example, as illustrated in FIG. 3C, the illumination securing assembly 230 may be embedded in the illumination body 200. The illumination securing assembly 230 may be in any form and/or shape that enables the illumination body 200 to secure to (and in some embodiments, unsecure from) the main housing body 110. For example, the illumination securing assembly 230 may be a connector, hinge, or the like, that secures to the main housing securing assembly 160 and/or directly to the main housing body 110. As another example, the illumination securing assembly 230 may be integrated with the main housing securing assembly 160. As another example, the illumination securing assembly 230 may be a magnetic element, or the like, in which case the main housing securing assembly 160 may also be a magnetic element, metal element, or the like.

The illumination securing assembly 230 may be formed in such a way as to allow an illumination assembly 200 to be positioned parallel to (or coplanar to or having parallel central axes with) the main housing body 110. FIG. 8A illustrates a side view of such an example embodiment, although the illumination securing assembly 230 is not shown in FIG. 8A. The illumination securing assembly 230 may also be formed in such a way as to allow a positioning of an illumination assembly 200 to be adjustable.

For example, FIG. 8B illustrates an example of an adjusted position of the illumination assembly 200 relative to the main housing body 110, which has been rotated in a clockwise direction in the Figure relative to the position illustrated in FIG. 8A. It is to be understood in the present disclosure that the illumination securing assembly 230 may be configurable or configured in such a way that the position of the illumination assembly 200 relative to the main housing body 110 may be further adjusted in a clockwise direction as compared to the position illustrated in FIG. 8B. It is also to be understood in the present disclosure that the illumination securing assembly 230 may be configurable or configured in such a way that the position of the illumination assembly 200 relative to the main housing body 110 may be further adjusted in a counter-clockwise direction as compared to the position illustrated in FIG. 8B. It is also to be understood in the present disclosure that the illumination securing assembly 230 may be configurable or configured in such a way that the position of the illumination assembly 200 relative to the main housing body 110 may be further adjusted in a counter-clockwise direction as compared to the position illustrated in FIG. 8A. It is also to be understood that such adjusting of a positioning of the illumination assembly 200 relative to the main housing body 110, as described in the present disclosure and illustrated in FIGS. 8A and 8B, may also be provided and/or available for one or more other sides of the main housing body 110 (e.g., bottom side 130, left side 140, and/or right side 150) without departing from the teachings of the present disclosure. In such example embodiments, the main housing securing assembly 160 will be provided on such one or more other sides of the main housing body 110 so as to enable the illumination securing assembly 230 of the illumination assembly 200 to secure to it.

Example Embodiments of the Rear Side Illumination Sources (e.g., Rear Side Illumination Source 240)

In an example embodiment, the illumination assembly 200 includes one or more rear side illumination sources 240. The one or more rear side illumination sources 240 are secured to the rear side 220 of the illumination body 200. For example, the illumination assembly 200 may include one rear side illumination source 240, which may be an elongated light source resembling or substantially similar to the shape of the rear side 220 (e.g., an elongated light source in the shape of a square, or the like). Alternatively or in addition, the illumination assembly 200 may include a plurality of rear side illumination sources 240, as illustrated in FIG. 3D.

The rear side illumination source 240 may be configurable or configured to transition between providing image capturing illumination (i.e., on state) and not providing image capturing illumination (i.e., off state). In an example embodiment, the rear side illumination sources 240 may be configurable or configured in such a way that an intensity, luminance, contrast, color, hue, direction, and/or any other controllable properties of light from one or more of the rear side illumination sources 240 may be varied, adjusted, and/or otherwise controlled.

For example, some or all of the rear side illumination sources 240 may be varied, adjusted, and/or otherwise controlled together at the same time. Alternatively or in addition, each rear side illumination source 240 may be independently varied, adjusted, and/or otherwise controlled. Alternatively or in addition, a subset or subgroup of the rear side illumination sources 240 may be varied, adjusted, and/or otherwise controlled (e.g., alternating or every other rear side illumination source 240; those on one, two, or three sides of the rear side 220; etc.) separately from one or more of the other rear side illumination sources 240. Furthermore, one, some, and/or all of the rear side illumination sources 240 may be varied, adjusted, and/or otherwise controlled independently from the one or more front side illumination sources 240 on the front side 220. Similarly, one, some, and/or all of the front side illumination sources 240 may be varied, adjusted, and/or otherwise controlled independently from the one or more rear side illumination sources 240 on the rear side 220.

Example Embodiments of the Front Side Illumination Sources (e.g., Front Side Illumination Source 240)

In an example embodiment, the illumination assembly 200 includes one or more front side illumination sources 240. The one or more front side illumination sources 240 are secured to the front side 210 of the illumination body 200. For example, the illumination assembly 200 may include one front side illumination source 240, which may be an elongated light source resembling or substantially similar to the shape of the front side 210 (e.g., an elongated light source in the shape of a square, or the like). Alternatively or in addition, the illumination assembly 200 may include a plurality of front side illumination sources 240, as illustrated in FIG. 3D.

The front side illumination source 240 may be configurable or configured to transition between providing image capturing illumination (i.e., on state) and not providing image capturing illumination (i.e., off state). In an example embodiment, the front side illumination sources 240 may be configurable or configured in such a way that an intensity, luminance, contrast, color, hue, direction, and/or any other controllable properties of light from one or more of the front side illumination sources 240 may be varied, adjusted, and/or otherwise controlled.

For example, some or all of the front side illumination sources 240 may be varied, adjusted, and/or otherwise controlled together at the same time. Alternatively or in addition, each front side illumination source 240 may be independently varied, adjusted, and/or otherwise controlled. Alternatively or in addition, a subset or subgroup of the front side illumination sources 240 may be varied, adjusted, and/or otherwise controlled (e.g., alternating or every other front side illumination source 240; those on one, two, or three sides of the front side 210; etc.) separately from one or more of the other rear side illumination sources 240. Furthermore, one, some, and/or all of the front side illumination sources 240 may be varied, adjusted, and/or otherwise controlled independently from the one or more rear side illumination sources 240 on the rear side 220. Similarly, one, some, and/or all of the rear side illumination sources 240 may be varied, adjusted, and/or otherwise controlled independently from the one or more front side illumination sources 240 on the front side 210.

Example Embodiments of the Illumination Controller (not Shown)

In an example embodiment, the illumination assembly 200 may include one or more illumination controllers (not shown). The illumination controller may be configurable or configured to establish a communication channel with the mobile device 200 (e.g., communication channels, as depicted by the bi-directional arrow in FIG. 2; and the bi-directional arrows between each illumination assembly 200 and the mobile device 10 housed in the main housing assembly 110 illustrated in FIGS. 6 and 7).

Figure 6:
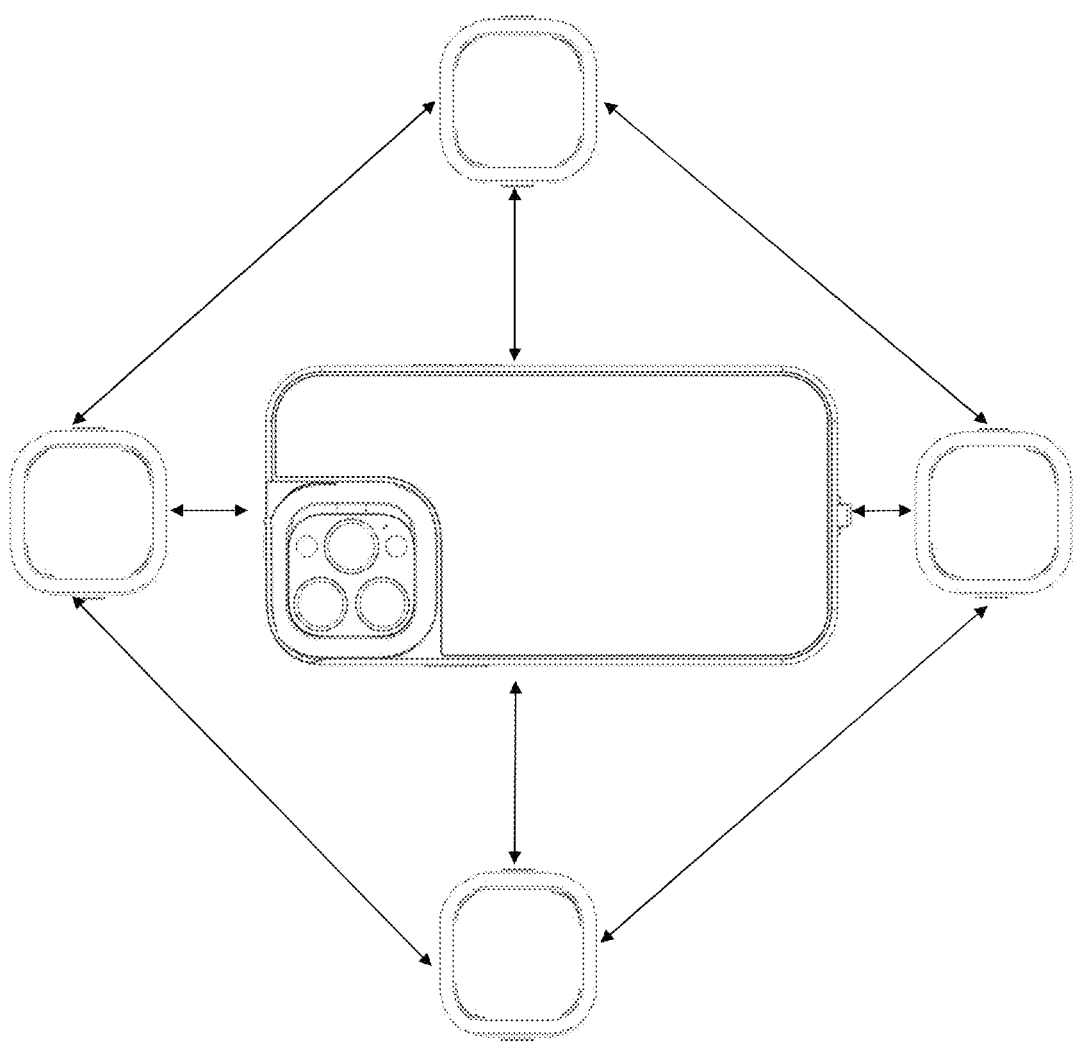
FIG. 6 illustrates a rear view of an example embodiment of a system for managing image capturing illumination for a mobile device wherein a plurality of illumination assemblies are unsecured from the main housing body and wirelessly communicating with each other and/or with the mobile device housed in the main housing assembly.

In example embodiments where the system 100 includes more than one illumination assembly 200, the illumination controller of a first illumination assembly 200 may be configurable or configured to establish a communication channel with an illumination controller of one or more of the other illumination assemblies 200 (e.g., communication channels, as depicted by the bi-directional arrows between illumination assemblies 200 in FIGS. 6 and 7). In such example embodiments, the illumination controller of the first illumination assembly 200, the illumination controllers of the one or more other illumination assemblies 200, and the mobile device 200 may collectively form a communication network together (e.g., a mesh network, etc.). Alternatively or in addition, the one or more other illumination controllers may communicate with the first illumination controller, which acts as a main or master illumination controller that communicates with the mobile device 10 on behalf of the illumination controllers. Other configurations and/or communication networks are also contemplated without departing from the teachings of the present disclosure.

The illumination controller may be configurable or configured to control one or more actions, aspects, and/or elements of the system 100, including those described above and in the present disclosure. As a non-limiting example, the illumination controller may be configurable or configured to turn on and/or turn off (e.g., transition between providing image capturing illumination (i.e., on state) and not providing image capturing illumination (i.e., off state)) one or more of the front side illumination sources 240. As another example, the illumination controller may be configurable or configured to turn on and/or turn off (e.g., transition between providing image capturing illumination (i.e., on state) and not providing image capturing illumination (i.e., off state)) one or more of the rear side illumination sources 240. As another example, the illumination controller may also be configurable or configured to vary, adjust, and/or otherwise control an intensity, luminance, contrast, color, hue, direction, and/or any other controllable properties of light from one or more of the rear side illumination sources 240. As another example, the illumination controller may also be configurable or configured to vary, adjust, and/or otherwise control an intensity, luminance, contrast, color, hue, direction, and/or any other controllable properties of light from one or more of the front side illumination sources 240.

The illumination controller may also be configurable or configured to communicate with the mobile device 10 to determine, among other things, whether the rear image capturing subsystem 10a and/or front image capturing subsystem 10b of the mobile device 10 are activated to capture an image. In such embodiment, if the illumination controller determines that the rear image capturing subsystem 10a of the mobile device 10 is activated to capture an image, the illumination controller may then communicate with the rear side illumination sources 240 to transition to the on state (providing image capturing illumination; if not already in the on state). However, if the illumination controller determines that the front image capturing subsystem 10b of the mobile device 10 is activated to capture an image, the illumination controller may then communicate with the front side illumination sources 240 to transition to the on state (providing image capturing illumination; if not already in the on state).

The illumination controller may also be configurable or configured to determine a position and/or orientation of the illumination body 200 before communicating with the front side illumination sources 240 and/or rear side illumination sources 24 to transition between the on state and off state. For example, if the illumination controller determines that the front image capturing subsystem 10b of the mobile device 10 is activated to capture an image but the illumination body 200 is in a first position (e.g., position as illustrated in at least FIG. 1), the illumination controller may be configured to control the front side illumination source 1024 to not provide image capturing illumination. As another example, if the illumination controller determines that the front imagine capturing subsystem 10b of the mobile device 10 is activated to capture an image and the illumination body 200 is in a second position (e.g., position as illustrated in at least FIG. 4C), the illumination controller may be configured to control the front side illumination source 1024 to provide image capturing illumination.

In an example embodiment, the communication channels established by and/or between the illumination controller and the mobile device 200 (and other illumination controllers) may be in any form and/or format. For example, the communication channels may include wireless communication channels, wired communication channels, Bluetooth communication channels, Wi-Fi communication channels, and/or any combination thereof.

The illumination controller, via the communication channel, may also be configurable or configured to determine whether an image capturing application (e.g., camera application, video conferencing application, or the like) is currently launched, functioning, and/or active on the mobile device 10. Responsive to a determination that an image capturing application is currently launched, functioning, and/or active on the mobile device 10, the illumination controller may then identify, via the communication channel, whether the rear image capturing subsystem 10a and/or the front image capturing subsystem 10b of the mobile device 10 are currently selected as the active image capturing subsystem in the currently launched image capturing application. Once the illumination controller identifies which of the front and/or rear image capturing subsystems 10a, 10b of the mobile device 10 is active (and/or whether an image capturing application is launched/active and/or a position of the illumination source 200), the illumination controller will then selectively control the front side illumination sources 240 and/or rear side illumination source 240 (e.g., control which to turn on and off; control luminance of light emitted; control color of light emitted; control direction of light emitted; etc.), as described above and in the present disclosure.

In an example embodiment, each of the plurality of the light sources of the rear and/or front side illumination sources 240 are selectively controllable by the illumination controller to provide image capturing illumination based on information received from the mobile device 10. For example, the information received from the mobile device 10 may include information obtainable from the rear image capturing subsystem 201, one or more other apps installed on the mobile device 10, information obtainable using the mobile device 10 (e.g., local weather conditions, local time zone information, geographical information, etc.), etc.

While various embodiments in accordance with the disclosed principles have been described above, it should be understood that they have been presented by way of example only, and are not limiting. Thus, the breadth and scope of the example embodiments described in the present disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, as referred to herein, a controller, processor, illumination controller, and/or device may be any computing device or communication device, and may include a virtual machine, computer, node, instance, host, or machine in a networked computing environment. Also as referred to herein, a network or cloud may be a collection of machines connected by communication channels that facilitate communications between machines and allow for machines to share resources. Network may also refer to a communication medium between processes on the same machine. Also as referred to herein, a network element, node, or server may be a machine deployed to execute a program operating as a socket listener and may include software instances.

Memory (or storage or database) may comprise any collection and arrangement of volatile and/or non-volatile components suitable for storing data. For example, memory may comprise random access memory (RAM) devices, read-only memory (ROM) devices, magnetic storage devices, optical storage devices, and/or any other suitable data storage devices. In particular embodiments, memory may represent, in part, computer-readable storage media on which computer instructions and/or logic are encoded. Memory may represent any number of memory components within, local to, and/or accessible by a processor.

Various terms used herein have special meanings within the present technical field. Whether a particular term should be construed as such a "term of art" depends on the context in which that term is used. Terms are to be construed in light of the context in which they are used in the present disclosure and as one of ordinary skill in the art would understand those terms in the disclosed context. Definitions provided herein are not exclusive of other meanings that might be imparted to those terms based on the disclosed context.

Words of comparison, measurement, and timing such as "at the time", "equivalent", "during", "complete", and the like should be understood to mean "substantially at the time", "substantially equivalent", "substantially during", "substantially complete", etc., where "substantially" means that such comparisons, measurements, and timings are practicable to accomplish the implicitly or expressly stated desired result.

Additionally, the section headings and topic headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A system for providing image capturing illumination for a mobile device, the mobile device including a mobile device housing, a rear image capturing subsystem provided at a rear side of the mobile device for enabling the mobile device to capture an image of a subject when the rear side of the mobile device is facing the subject, and a front image capturing subsystem provided at a front side of the mobile device for enabling the mobile device to capture an image of the subject when the front side of the mobile device is facing the subject, the system comprising:

a main housing assembly, the main housing assembly configured to house at least a portion of the mobile device housing of the mobile device;

an illumination assembly, the illumination assembly securable to the main housing assembly, the illumination assembly including:

an illumination body, the illumination body including a rear illumination body side and a front illumination body side;

an illumination securing assembly, the illumination securing assembly configured to secure the illumination body to the main housing assembly, the illumination securing assembly further configured to enable the illumination body to move between a first position and a second position relative to the main housing assembly;

a rear side illumination source, the rear side illumination source provided on the rear illumination body side of the illumination body, the rear side illumination source configured to transition between providing image capturing illumination and not providing image capturing illumination;

a front side illumination source, the front side illumination source provided on the front illumination body side of the illumination body, the front side illumination source configured to transition between providing image capturing illumination and not providing image capturing illumination; and an illumination controller, the illumination controller configured to control at least one of the following:
control the rear side illumination source to provide image capturing illumination;
control the front side illumination source to provide image capturing illumination;
control both the rear side illumination source and the front side illumination source to provide image capturing illumination; and
control both the rear side illumination source and the front side illumination source to not provide image capturing illumination.

2. The system for providing image capturing illumination of claim 1, wherein at least one of the following apply:
the main housing assembly is a protective body securable to at least a sidewall of the mobile device housing of the mobile device;
the illumination body is formed in a shape that resembles a square;
the illumination body is formed in a shape that resembles a rectangle;
the illumination body is formed in a shape that resembles a geometric shape; and
the illumination body is formed in a shape that resembles the rear image capturing subsystem of the mobile device.

3. The system for providing image capturing illumination of claim 1,
wherein the main housing assembly includes a rear main housing body wall covering at least a portion of the rear side of the mobile device housing of the mobile device;
wherein the main housing assembly includes an elongated receiving assembly secured to an inner surface of the rear main housing body wall, the elongated receiving assembly having a first end and a second end, the elongated receiving assembly configured to receive the illumination securing assembly and restrict movement of the illumination securing assembly to be between the first and second ends of the elongated receiving assembly.

4. The system for providing image capturing illumination of claim 3,
wherein when the illumination securing assembly is positioned at the first end of the elongated receiving assembly, the illumination body is positioned such that a center axis of the illumination body is coaxial to the center axis of the rear image capturing subsystem.

5. The system for providing image capturing illumination of claim 3,
wherein the illumination assembly includes a second illumination securing assembly;
wherein the elongated receiving assembly includes a second elongated rail assembly, the second elongated rail assembly having a first end and a second end, the second elongated rail assembly configured to receive the second illumination securing assembly and restrict movement of the second illumination securing assembly to be between the first and second ends of the second elongated receiving assembly.

6. The system for providing image capturing illumination of claim 1, wherein at least one of the following apply:
the rear side illumination source includes a plurality of light sources, including a first light source and a second light source; and
the front side illumination source includes a plurality of light sources, including a third light source and a fourth light source.

7. The system for providing image capturing illumination of claim 6, wherein at least one of the following apply:
the first light source is controllable independently from the second light source;
the first light source is controllable independently from the third and fourth light sources;
the third light source is controllable independently from the fourth light source;
the third light source is controllable independently from the first and second light sources;
a color of at least one of the first light source, second light source, third light source, and fourth light source is adjustable;
a luminance of at least one of the first light source, second light source, third light source, and fourth light source is adjustable; and
a direction of at least one of the first light source, second light source, third light source, and fourth light source is adjustable.

8. The system for providing image capturing illumination of claim 1, wherein at least one of the following apply:
the illumination controller is in communication with the mobile device via a wireless connection;
the communication channel between the illumination controller and the mobile device is a wired connection;
the illumination controller is in communication with the mobile device via a Bluetooth connection;
the illumination controller is in communication with the mobile device via a Wi-Fi connection;
the illumination controller is configured to determine whether the rear image capturing subsystem of the mobile device is activated to capture an image;
the illumination controller is configured to determine whether an image capturing application is currently launched on the mobile device;

the illumination controller is configured to determine whether the front image capturing subsystem of the mobile device is activated to capture an image; and the illumination controller is configured to determine whether an image capturing application is currently launched on the mobile device.

9. The system for providing image capturing illumination of claim 1, wherein the rear side illumination source includes a plurality of light sources;

wherein the controlling of the rear side illumination source to provide image capturing illumination includes selectively controlling, by the illumination controller, one or more of the plurality of light sources of the rear side illumination source to provide image capturing illumination; and wherein the selective controlling, by the illumination controller, of the one or more of the plurality of light sources of the rear side illumination source to provide image capturing illumination includes controlling a color and/or luminance of the one or more of the plurality of light sources of the rear side illumination source.

10. The system for providing image capturing illumination of claim 9, wherein each of the plurality of light sources of the rear side illumination source is selectively controlled, by the illumination controller, to provide image capturing illumination based on information received from the mobile device.

11. The system for providing image capturing illumination of claim 9, wherein the system further includes a light sensor; and wherein each of the plurality of light sources of the rear side illumination source is selectively controlled, by the illumination controller, to provide image capturing illumination based on readings of the light sensor.

12. The system for providing image capturing illumination of claim 1, wherein the front side illumination source includes a plurality of light sources;

wherein the controlling of the front side illumination source to provide image capturing illumination includes selectively controlling, by the illumination controller, one or more of the plurality of light sources of the front side illumination source to provide image capturing illumination; and wherein the selective controlling, by the illumination controller, of the one or more of the plurality of light sources of the front side illumination source to provide image capturing illumination includes controlling a color and/or luminance of the one or more of the plurality of light sources of the front side illumination source.

13. The system for providing image capturing illumination of claim 12, wherein each of the plurality of light sources of the front side illumination source is selectively controlled, by the illumination controller, to provide image capturing illumination based on information received from the mobile device.

14. The system for providing image capturing illumination of claim 1, wherein the illumination assembly is detachable from the main housing assembly.

15. The system for providing image capturing illumination of claim 1, further comprising one or more second illumination assemblies, each second illumination assembly including:

a second illumination body, the second illumination body including a second rear illumination body side and a second front illumination body side;

a second rear side illumination source, the second rear side illumination source provided on the second rear illumination body side of the second illumination body, the second rear side illumination source configured to transition between providing image capturing illumination and not providing image capturing illumination;

a second front side illumination source, the second front side illumination source provided on the second front illumination body side of the second illumination body, the second front side illumination source configured to transition between providing image capturing illumination and not providing image capturing illumination; and a second illumination controller, the second illumination controller configured to control at least one of the following:

control the rear side illumination source to provide image capturing illumination;

control the front side illumination source to provide image capturing illumination;

control both the rear side illumination source and the front side illumination source to provide image capturing illumination; and control both the rear side illumination source and the front side illumination source to not provide image capturing illumination.

16. A system for providing image capturing illumination for a mobile device, the mobile device including a mobile device housing, a rear image capturing subsystem provided at a rear side of the mobile device for enabling the mobile device to capture an image of a subject when the rear side of the mobile device is facing the subject, and a front image capturing subsystem provided at a front side of the mobile device for enabling the mobile device to capture an image of the subject when the front side of the mobile device is facing the subject, the system comprising:

a main housing assembly, the main housing assembly configured to house at least a portion of the mobile device housing of the mobile device, the main housing assembly including:

a main housing body configured to house the mobile device housing of the mobile device;

an image capturing opening, the image capturing opening being an opening formed through the main housing body for the rear image capturing subsystem of the mobile device; and a main housing securing assembly, the main housing securing assembly secured to the main housing body; and an illumination assembly, the illumination assembly securable to the main housing assembly, the illumination assembly including:

an illumination body, the illumination body including a rear illumination body side and a front illumination body side, the rear illumination body side facing a first direction, the front illumination body side facing a second direction;

an illumination securing assembly, the illumination securing assembly configured to secure the illumination body to the main housing securing assembly, the illumination securing assembly further configured to enable the illumination body to move between a first position and a second position relative to the main housing body while remaining secured to the main housing securing assembly;

a rear side illumination source, the rear side illumination source provided on the rear illumination body side of the illumination body, the rear side illumination source configured to selectively transition between providing image capturing illumination in the first direction and not providing image capturing illumination in the first direction based on information obtained from the mobile device;

a front side illumination source, the front side illumination source provided on the front illumination body side of the illumination body, the front side illumination source configured to transition between providing image capturing illumination in the second direction and not providing image capturing illumination in the second direction based on information obtained from the mobile device.

17. The system for providing image capturing illumination of claim 16, wherein at least one of the following apply:
the main housing body is a protective body securable to at least a sidewall of the mobile device housing of the mobile device;
the image capturing opening is formed in a shape that resembles a square;
the image capturing opening is formed in a shape that resembles a rectangle;
the image capturing opening is formed in a shape that resembles a geometric shape;
the image capturing opening is formed in a shape that resembles the rear image capturing subsystem of the mobile device;
the illumination body is formed in a shape that resembles a square;
the illumination body is formed in a shape that resembles a rectangle;
the illumination body is formed in a shape that resembles a geometric shape;
the illumination body is formed in a shape that resembles the rear image capturing subsystem of the mobile device; and
the illumination body is formed in a shape that resembles the image capturing opening.

18. The system for providing image capturing illumination of claim 16,
wherein the illumination assembly includes a second illumination securing assembly;
wherein the elongated receiving assembly includes a second elongated rail assembly, the second elongated rail assembly having a first end and a second end, the second elongated rail assembly configured to receive the second illumination securing assembly and restrict movement of the second illumination securing assembly to be between the first and second ends of the second elongated receiving assembly.

19. The system for providing image capturing illumination of claim 16, wherein at least one of the following apply:

the rear side illumination source includes a plurality of light sources, including a first light source and a second light source; and
the front side illumination source includes a plurality of light sources, including a third light source and a fourth light source.

20. The system for providing image capturing illumination of claim 19, wherein at least one of the following apply:
the first light source is controllable independently from the second light source;
the first light source is controllable independently from the third and fourth light sources;
the third light source is controllable independently from the fourth light source;
the third light source is controllable independently from the first and second light sources;
a color of at least one of the first light source, second light source, third light source, and fourth light source is adjustable;
a luminance of at least one of the first light source, second light source, third light source, and fourth light source is adjustable; and
a direction of at least one of the first light source, second light source, third light source, and fourth light source is adjustable.

21. The system for providing image capturing illumination of claim 16,
wherein the illumination assembly is detachable from the main housing assembly by detaching the illumination securing assembly from the main housing securing assembly;
wherein the main housing assembly further includes one or more second main housing securing assemblies formed on a top side, bottom side, left side, and/or right side of the main housing body; and
wherein the illumination securing assembly, when not secured to the main housing securing assembly, is securable to one of the one or more second main housing securing assemblies.

22. The system for providing image capturing illumination of claim 16, further comprising one or more second illumination assemblies, each second illumination assembly including:
a second illumination body, the second illumination body including a second rear illumination body side and a second front illumination body side;
a second rear side illumination source, the second rear side illumination source provided on the second rear illumination body side of the second illumination body, the second rear side illumination source configured to transition between providing image capturing illumination and not providing image capturing illumination based on information from the mobile device;
a second front side illumination source, the second front side illumination source provided on the second front illumination body side of the second illumination body, the second front side illumination source configured to transition between providing image capturing illumination and not providing image capturing illumination based on information from the mobile device.

* * * * *